United States Patent
Murase

(10) Patent No.: US 6,993,031 B2
(45) Date of Patent: Jan. 31, 2006

(54) CACHE TABLE MANAGEMENT DEVICE FOR ROUTER AND PROGRAM RECORDING MEDIUM THEREOF

(75) Inventor: Tutomu Murase, Tokyo (JP)

(73) Assignee: NEC Corporation, Tokyo (JP)

( * ) Notice: Subject to any disclaimer, the term of this patent is extended or adjusted under 35 U.S.C. 154(b) by 772 days.

(21) Appl. No.: 09/828,160

(22) Filed: Apr. 9, 2001

(65) Prior Publication Data

US 2001/0028651 A1 Oct. 11, 2001

(30) Foreign Application Priority Data

Apr. 7, 2000 (JP) ........................................ 2000-106744

(51) Int. Cl.
*H04L 12/54* (2006.01)

(52) U.S. Cl. .................................. 370/395.32; 370/428
(58) Field of Classification Search ................. 370/389, 370/392, 395.2, 395.31, 395.32, 395.42, 370/428, 429
See application file for complete search history.

(56) References Cited

U.S. PATENT DOCUMENTS

| | | | | |
|---|---|---|---|---|
| 5,946,679 A | * | 8/1999 | Ahuja et al. .................... | 707/3 |
| 6,104,701 A | * | 8/2000 | Avargues et al. ............ | 370/238 |
| 6,295,296 B1 | * | 9/2001 | Tappan ........................ | 370/392 |
| 6,522,632 B1 | * | 2/2003 | Waters et al. ................ | 370/254 |
| 6,665,297 B1 | * | 12/2003 | Hariguchi et al. .......... | 370/392 |
| 6,697,363 B1 | * | 2/2004 | Carr ............................ | 370/389 |
| 6,768,739 B1 | * | 7/2004 | Kobayashi et al. .......... | 370/392 |

FOREIGN PATENT DOCUMENTS

| | | |
|---|---|---|
| EP | 1 035 687 | 9/2000 |
| JP | 6-261078 | 9/1994 |
| JP | H10-290232 A | 10/1998 |
| JP | H11-112564 A | 4/1999 |
| JP | H11-289345 A | 10/1999 |

\* cited by examiner

*Primary Examiner*—Kwang Bin Yao
(74) *Attorney, Agent, or Firm*—Sughrue Mion, PLLC

(57) ABSTRACT

A cache table management device for raising the cache hit probability for entries inserted in groups between a forwarding table 103 and cache 102. A forwarding table 103 stores the priority level of entries inserted and extracted in a cache 102. A packet processing circuit 101 extracts the destination address from the received packet, searches the packet using the destination address, and searches the forwarding table if no hits occur. The hit database 104 stores the contents of the forwarding table for all forwarding table entries, as well as rating values for the cache usage status. An entry selection device 105 refers to the hit database when an entry must be added or deleted between the forwarding table and the cache, and selects the corresponding entry group. That determination is made utilizing typical values for attributes of the priority level such as the average bit rate of each entry group.

8 Claims, 14 Drawing Sheets

FIG. 12

| IP PREFIX | PREFIX LENGTH | OUTPUT PORT IF NO. | USAGE TIME |
|---|---|---|---|
| 100.120.0.0 | 16 | 3 | 3:00, 2:00 |
| 100.0.0.0 | 8 | 1 | 1:00, 0:30 |
| 100.120.140.0 | 24 | 2 | 5:00 |
| 100.120.180.0 | 24 | 4 | 2:00, 1:00 |

CACHE TABLE MANAGEMENT DEVICE FOR ROUTER AND PROGRAM RECORDING MEDIUM THEREOF

BACKGROUND OF THE INVENTION

1. Field of the Invention

The present invention relates to a cache table management technique for routers and relates in particular to management of a cache table when entries are entered or extracted in groups between the forwarding table and cache table.

2. Description of the Related Art

Routers connected to a plurality of networks, carry out communications over different networks. To perform this task, the routers connecting the plurality of networks must transfer (or forward) clusters of communication information (packets)

Routers receive packets input from connected networks at a network interface (hereafter, referred to as "interface"). Based on the transmit destination address contained in the header portion of the received packet, the router searches the forwarding table held by each router, and determines a interface number for transmitting the packet, and forwards the packet to the determined interface.

When a large number of networks are connected to the router and a large number of terminals connected to the network, the forwarding table held by router is on a vast scale so the router forwarding process slows down.

A technology was disclosed in the related art for forwarding and high speed packet processing using cache tables.

In Japanese Patent Laid-Open No. 6-261078, the interface for each router contains a routing table and a cache memory for searching the routing table.

The routing table in the router is written with information indicating whether packets can arrive to the destination network via an interface of the router. Each of entries in the routing table, stores the destination network address, the mask corresponding to each destination network address, the destination network address within the transmission network and the transmission interface number.

The cache memory contains a CAM (Content Addressable Memory) and a correspondence table. The destination network address acquired by the pointer to the applicable entry on the routing table is stored in the CAM. This correspondence table holds entries linked to the CAM entries, and stores pointers for the applicable entry of the routing table.

When searching a routing table once again for the same network address, the network address is first collated with CAM destination network addresses, and when an applicable address is found, a pointer is acquired for a routing table from entries for tables matching links to entries stored in the applicable CAM network address.

Searching of tables is speeded up since destination network addresses having a large search count are stored in the cache memory, and the use of correspondence tables allows reducing the CAM entry size.

However, this technology utilized the complete match search method containing a host address as the search key for making table searches of the cache memory. Consequently, this technology had the problems that too much time was required for searches, and that a huge cache memory was required for raising the hit rate.

Whereupon, in EP-A-1035687 describes a router including a forwarding table capable of being longest prefix match searched and a cache table capable of being longest prefix match searched.

The respective table structures and search methods for this technology are first explained. In a first structural example, a forwarding table has entries containing all paths needed in the routing, and a cache table stores a portion of the forwarding table entries. In a second structural example, a cache memory stores a portion of the forwarding table entries and the forwarding table stores all required entries except for those stored in the cache table.

An operation to enter and extract entries from the cache table and forwarding table is necessary in order to raise the cache hit rate. In the first structural example, the entry is copied from the forwarding table to the cache table, and the entry is discarded (deleted) from the cache table to the forwarding table. In the second structural example however, the entry is moved from the forwarding table to the cache table, the entry is also of course, moved from the cache table to the forwarding table. In the following explanation, the copy and delete operations in the first structural example are described. In the case of the second structural example however, the copying in the first structural example is equivalent to moving (operation), while the deletion operation in the first structural example is equivalent to moving. Copying is referred to simply as "input".

A long search time is required for searching the large quantity of data in the forwarding table. The cache table on the other hand, requires only a short search time though it has only a small data storage capacity. When a search request is made, the cache is first searched for a longest prefix match. If an entry is found in the cache (called "hit") then the search ends here. However, if an entry is not found (called "mishit"), then a longest prefix match search is then made in the forwarding table. The forwarding table contains all entries, so a search will always find a hit and the search then ends. As also described in, in EP-A-1035687, the longest prefix match is search for matching prefixes from among possible entry candidates and the entry having the longest matching prefix is the hit entry.

When there are for example, four entries having network addresses shown by the prefixes (A) 100.120.0.0/16 (B) 100.0.0 0/8 (C) 100.120.140.0/24 and (D) 100.120.180.0/24, a network address of "100.120.140.5" is assigned as a search key. Here, the 100.120.0.0 are called the prefix bits and numbers punctuated by periods are respectively 8 bits expressed in decimal notation. When a decimal number comprised of these 8 bits is 0 (zero) it signifies an optional (don't care) number. The number after the / signifies the prefix length. A network address of "100.120.140.5" is a match for any of the prefixes (A) (B) and (C) so that (A) (B) and (C) all become search candidates. However, in a longest matching prefix search, the entry having the longest prefix length is selected so that in this case, the longest prefix length equals 24 so that the search result (C) 100.120.140.0/ 24 is a hit.

Next, the entries input to the cache table are described. In the invention disclosed in EP-A-1035687, the insertion and extraction of entries from the cache table is not the copy or deletion of particular single entries but instead the movement of a plurality or in some cases single entries under specified rules. In other words, the short part of the prefix length for an entry having the same prefix is called the parent and the long part of the prefix length is called the child, and when input to a cache, all of its children are always input together into the cache, and during output from a caches all of its parents are always extracted together from the cache.

In the following description, the plurality of entries for movement complying with this system are referred to as entry groups.

A specific example for making an entry group is described next. In the four entries (A) (B) (C) (D) for example, when the entry called (A) 100.120.0.0/16 is moved to the cache from the forwarding table, (A) (C) and (D) become an entry group. Next, when (A) is moved from the cache table to the forwarding table, only (A) becomes an entry group.

When the interface numbers serving as the output path numbers for the above (A) 100.120.0.0/16 (C) 100.120.140.0/24 and (D) 100.120.180.0/24 are different. If only (A) 100.120.0.0/16 is placed in the cache, and a search key of "100.120.140.5" is then applied, the interface number matching (C) should be obtained at the longest prefix match searching result. In this case, however, the interface number matching with (A) is instead obtained from the entries in the cache. Also, when (C) is taken out of the cache and (A) is left in the cache, and the search key of "100.120.140.5" is applied, instead of the interface number matching (C), the interface number matching (A) will be a hit in the cache.

In the cache system, however, since the data to be entered in the cache is a portion of the entire data in the forwarding table, an entry must be selected from the forwarding table and input to the cache. At this time, the cache hit probability must be raised in order to perform a high speed search, so selection of the entry to be placed in the cache is a critical issue. Also, when dynamic changes occur in the contents of the cache entries, the selection of entries to be extracted from the cache also becomes a critical issue.

The LRU (Least Recently Used) method was utilized as a selection method in the forwarding technology in the above two examples. However, even though the LRU method is effective in inputting and extracting individual entries, the LRU has a first problem in that in contrast to the individual entries as in EP-A-1035687, the LRU is not effective for use with entry groups or in other words, under the restriction of inputting and extracting a plurality of related entries in clusters. As shown in FIG. 12 for example, when extracting (C) from a cache containing prefix (A) 100.120.0.0/16 with time sequence "3:00" "2:00", and prefix (C) 100.120.140.0/24 with time base "1:00" and "0:30", the (A) or parent is extracted but the (D) prefix having a older time usage than (A) will still remain in the cache.

An algorithm such as the LRU tends to handle data mechanically according the number of times the data is referred to for making a selection, creating a second problem that a criticality (or importance) level cannot be assigned to data as needed or more specifically, that the extent of line connections cannot be easily assigned according to policy or a fee system. For example even in cases where entries have different levels of importance (criticality), the conventional LRU method treats the input and output of all entries from the cache in the same way, so that data cannot be handled according to its level of importance.

SUMMARY OF THE INVENTION

The present invention has the object of providing a management device and program recording medium for input and output of entry groups from the cache to improve router packet processing time by raising the cache hit rate in routers having caches, and lower the probability of having to search the forwarding table which requires more time than searching the cache and also reduce the router packet processing time.

Another object of the invention is selection of an entry group for assigning a weight to the search process, according to the criticality (importance) of the entry, or in other words to provide a method for selecting entry groups to input or extract from the cache.

The cache table management device used in the router of this invention is comprised of:

(a) a forwarding table having a plurality of entries, each of said entries having a set of information showing a collection of addresses comprised of prefix bits and prefix lengths, information showing packet output paths for the address collection, the priority level information, and said forwarding table being searched by a longest prefix match search;

(b) a cache table for, when entries are substituted, being written the entry group containing the entry to be substituted and the applicable child of the substituted entry from the forwarding table, and for being deleted on moved, when deleting or moving entries, the entry group containing the applicable entry and the applicable parent of the deleted on moved entry;

(c) hit record database containing hit information added to the contents of the applicable entry among all entries of the forwarding table, contents of said hit record database being updated when a hit occurs in the forwarding table or the cache table;

(d) a packet processing circuit to extract the destination network address from an input packet, to search the forwarding table or the cache table using the destination network address as a key, and to transmit the packet on the acquired output paths; and (e) an entry selection circuit to select entry groups to be interchanged when needed while taking the information from the bit data base and priority level information into account.

In the invention, entries with a high hit probability can be placed in the cache so that searches can be made successful with high probability, and the overall search processing speed is improved. In other words, when entries having a high hit probability are known, the applicable entries are input into the cache according to their order of priority so that the cache contents have a high hit probability. Conversely, entries with a low hit probability can be given a lower priority level and largely eliminated from the cache so that the cache can be effectively used.

The hit probability can be raised because a typical value for the entry group can be obtained utilizing a total figure for the average, maximum value and minimum value of the entry group. The entry group is comprised of a large number of entries, and when known that some entries are rarely used, the typical value can be determined by utilizing just a portion of that entry group, and that typical value is near the true value of that entry group.

The search speed can be adjusted according to the criticality (importance level), by establishing a priority level to the entry or cache area according to the criticality assigned by means of the policy or the fee system.

BRIEF DESCRIPTION OF THE DRAWINGS

FIG. 12 is a figure for specifically describing the invention.

DESCRIPTION OF THE PREFERRED EMBODIMENTS

The preferred embodiments of the invention are hereafter described while referring to the accompanying drawings.

Figure 1:
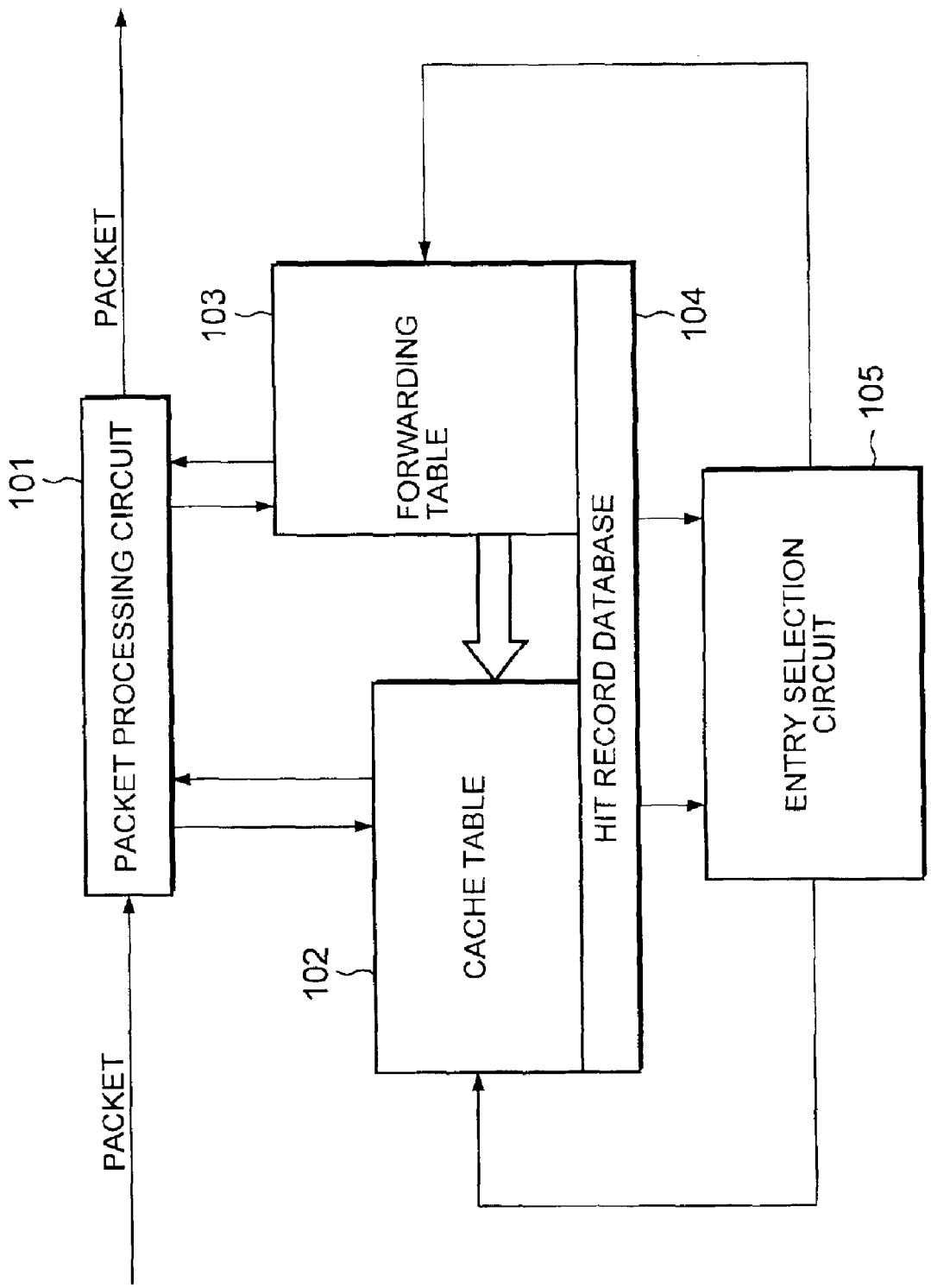
FIG. 1 is a block diagram of the first embodiment of the invention.

FIG. 1 is a block diagram of the entire structure of the first embodiment of the router of the invention. The router is comprised of a packet processing circuit 101, a cache table 102, a forwarding table 103, a hit record database 104 and an entry selection circuit 105. Each component of the router is described next. Here, the description assumes use of the first structural example. In other words, entries containing all paths necessary for routing are input into the forwarding table 103, and a portion of entries of the forwarding table 103 is input into the cache table 102.

In FIG. 1, the packet processing circuit 101 is connected to the cache table 102 and the forwarding table 103. The cache table 102 is connected to the forwarding table 103 and the hit record database 104 and the entry selection circuit 105. The hit record database 104 is further connected to the forwarding table 103 and the entry selection circuit 105. The entry selection circuit 105 is connected to the cache table 102 and the forwarding table 103. Unless stated otherwise, the longest prefix search is hereafter referred to simply as search.

The forwarding table 103 contains a plurality of stored entries each of which stores the following information:
(a) information showing a collection of addresses including prefix bits and prefix lengths,
(b) information showing packet output paths for the address collection, and
(c) priority level information for selecting entries when interchanging entries in the forwarding table 103 and the cache table 102.

The cache table 102 is stored with contents for all entries (entry groups) of forwarding table 103 found as "parent" hit entries when the forwarding table 103 was searched using the transmission destination address of the received packet as the key. Referring here to cache tables and forwarding tables, also includes their related search devices as well as the tables themselves.

When a packet is input, the packet processing circuit 101 extracts the destination network address (hereafter "address") from the packet and uses that destination network address as a key to search the cache table 102. The cache table 102 is searched with this key and if an entry hit is found, the information that a hit entry was found is notified to the packet processing circuit 101 along with the address of the cache table 102 holding the hit entry. However, when no hit is found in the cache table 102, a mishit is reported to the packet processing circuit 101. The packet processing circuit 101 ends the search processing when notified with the hit address, or performs a search of the forwarding table 103 when notified of a mishit.

In the search of the forwarding table 103, a destination network address is input as the key to the forwarding table 103. The forwarding table 103 is then searched by means of the destination network address (key) that was input, and the packet processing circuit 101 is notified with the hit address of the forwarding table 103.

At this time, either one of the cache table 102 or forwarding table 103 having a hit, rewrites the hit record database 104. The hit record database 104 is written with information for all forwarding table entries such as the entry number, the hit address in the cache table 102, the hit address in the forwarding table 103, the priority level of each entry, the time of the hit, and what entry is affiliated with the same entry of an entry group. The entry priority level here, signifies what entry of the entries of forwarding table 103 should be input to the cache table 102, or what entry should be extracted, according to the priority level, and as described later on, is determined by priority level information such as the entry characteristic threshold value, entry characteristic range, number of hits stored also in the forwarding table, and the hit time stored only in the hit data base, etc.

The forwarding table 103 copies the contents of the entries in the forwarding table 103 to the cache table 102 according to instructions from the entry selection circuit 105. The entries input from the cache table 103 are stored (or written) according to instructions from the entry selection circuit 105, and the entry contents are erased (deleted) according to instructions from the entry selection circuit 105.

The entry selection circuit 105 determines the entry present in the cache table 102 based on the priority level of each entry, after referring to the hit database 104, and commands the moving (storing or deletion) of data to the cache table 102 and the forwarding table 103.

The elements 101 through 105 comprising the above packet processing circuit 101 are next explained in detail while referring to FIG. 2, FIG. 3, FIG. 4 and FIG. 5.

Figure 2:
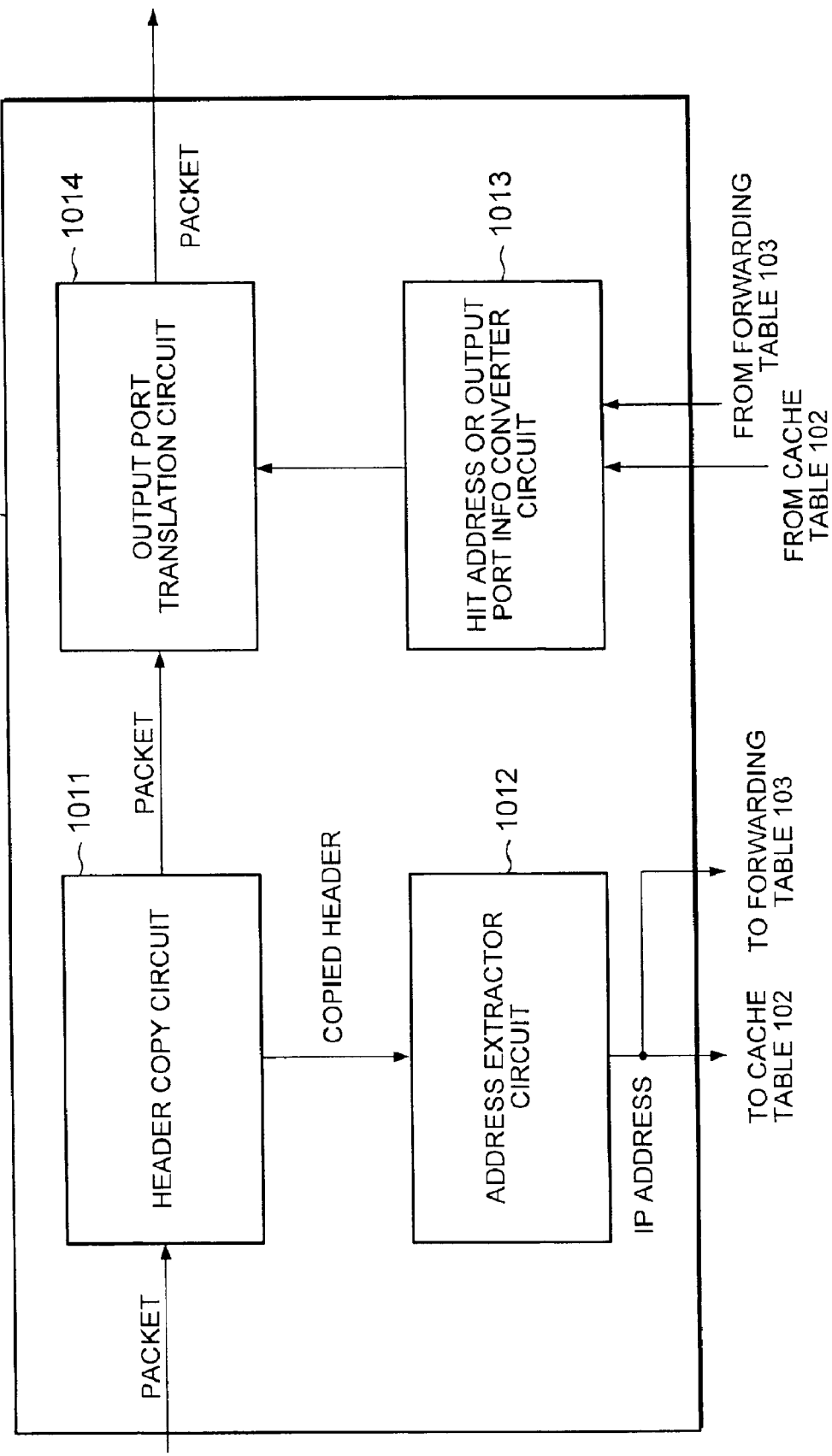
FIG. 2 is a detailed block diagram of the packet processing circuit 101 in FIG. 1.

FIG. 2 is a block diagram showing the packet processing circuit 101 in detail. The packet processor circuit 101 shown in FIG. 2, is comprised of a header copy circuit 1011, an address extractor circuit 1012, a hit address or output port information converter circuit 1013, and an output port transration circuit 1014.

The header copy circuit 1011 receives the packet, copies the header containing the IP address from this packet, and sends it to the address extractor circuit 1012. The packet itself is sent to the output port transration circuit 1014. The address extractor circuit 1012 extracts the IP address from the copied header, and sends it to the cache table 102 and the forwarding table 103. The hit address or output port information converter circuit 1013 receives the hit address information from either of the cache table 102 or the forwarding table 103, converts the hit address information to output port information and sends the information to the output port transration circuit 1014. The output port transration circuit 1014 receives the packet from the header copy circuit 1011, and receives the output port information from hit address or output port information converter circuit 1013, and links them. The conversion in the hit address or output port information converter circuit 1013 is implemented by searching the table. The table consists of a combination of the hit addresses and the output port interface numbers.

Figure 3:
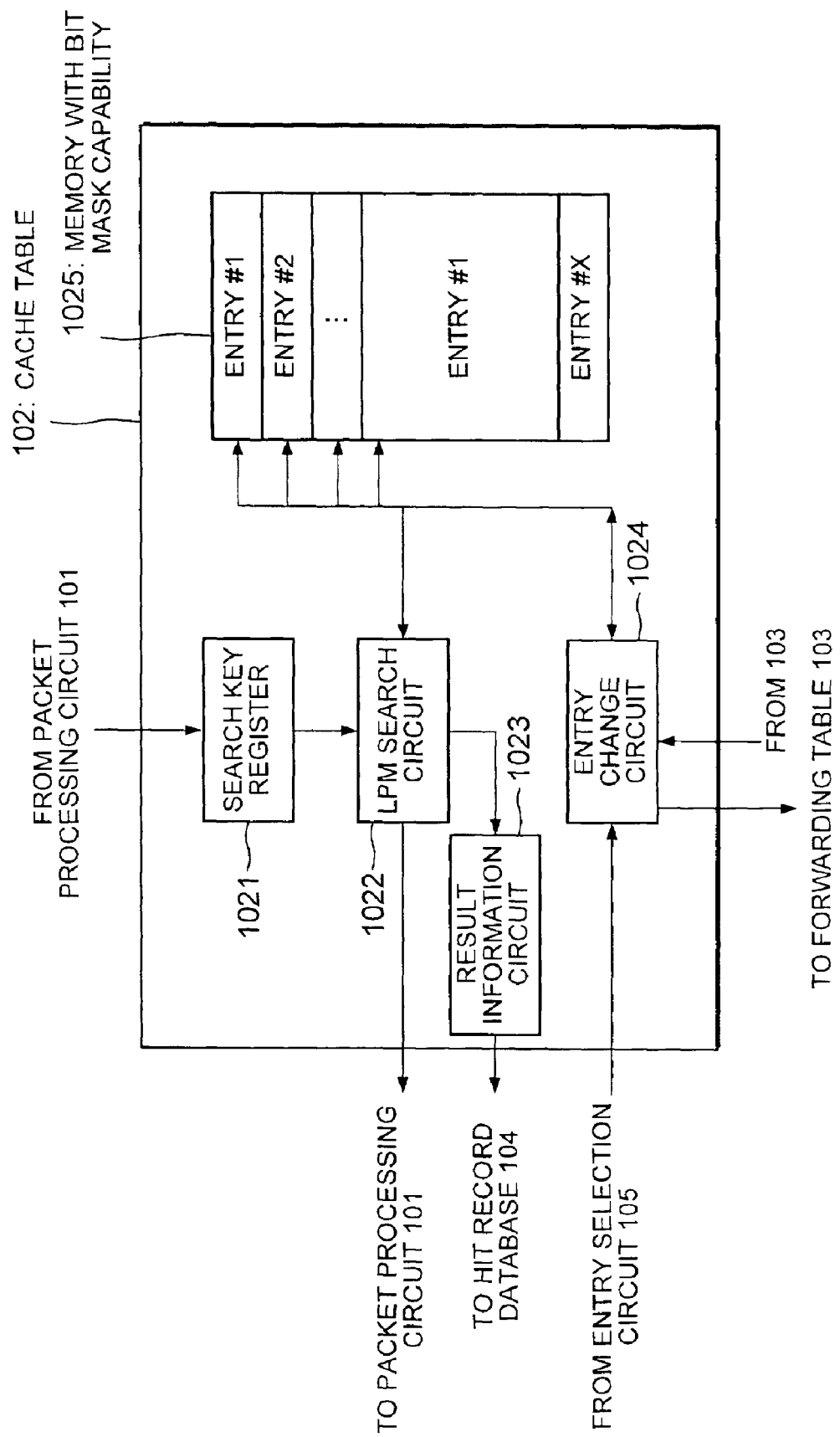
FIG. 3 is a detailed block diagram of the cache table 102 in FIG. 1.

The cache table 102 is shown in detail in FIG. 3. The cache table 102 according to FIG. 3 is comprised of a search key register 1021, a longest prefix search circuit 1022, a result information circuit 1023, an entry circuit 1024, and a memory with bit mask capability 1025. The search key register 1021 receives the IP address from the address extractor circuit 1012 in the packet processing circuit 101. The longest prefix search circuit 1022 compares the IP address and the contents of each entry of the memory with bit mask capability 1025, and determines the entry constituting the longest prefix match. The longest prefix search circuit 1022 sends the determined entry address (memory address) or in other words the hit address or information that there is no match, to the packet processing circuit 101 and the result information circuit 1023. The result information circuit 1023 sends the time of the hit in the address, or in other words, information on the current time, to the hit database 104. The entry circuit 1024 receives the information sent from the entry selection circuit 105 and the forwarding table 103, and deletes, rewrites (updates) or reads out each entry of the memory with bit mask capability 1025 based on the received information.

The forwarding table 103 is of course on a larger scale than the cache table 102 but that structure is identical to the block diagram of the cache table 102 shown in FIG. 3.

Figure 4:
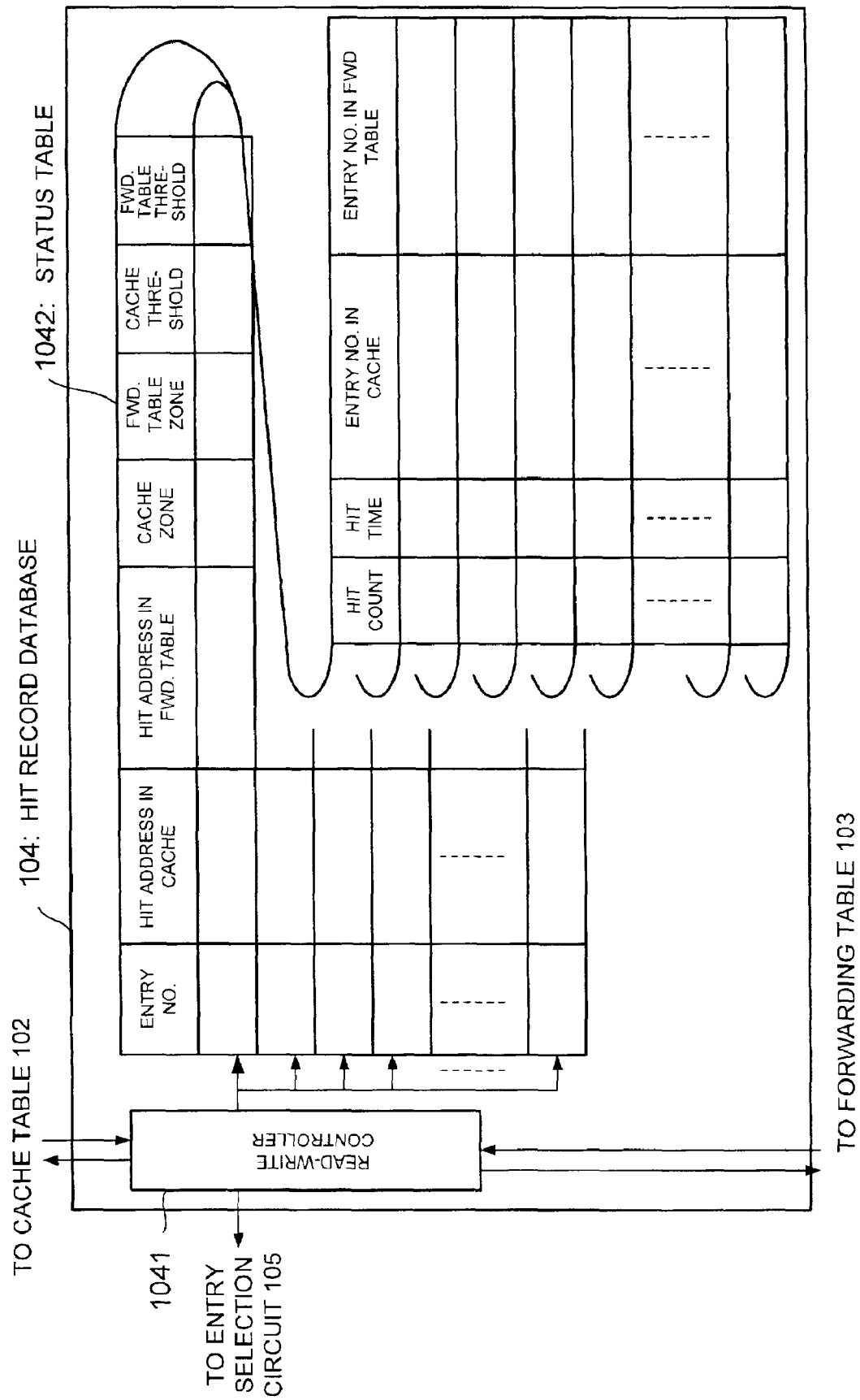
FIG. 4 is a detailed block diagram of the hit record database 104 in FIG. 1.

The hit record database 104 is shown in detail in FIG. 4. The hit record database 104 of FIG. 4 is comprised of a read/write controller 1041 and a status table 1042.

The read/write controller 1041 receives the hit address and hit address time information from the cache table 102 or the forwarding table 103, and writes a hit address from the status table 1042 and corresponding hit time information for that entry. When hit information is received from the forwarding table 103, the read/write controller 1041 sends all entry information of a entry group comprised of the hit entry and the child entry (or entries), to the entry selection device 105.

The status table 1042 stores in each entry, the number of that entry, the hit address in the cache table 102, the hit address in the forwarding table 103, the entry zone for the cache table 102, the threshold value in the cache table 102, the threshold value in the forwarding table 103, the number (count) of cache hits, the hit time, the entry number when input to the entry group in the cache table 102 and the entry number when input to the entry group in the forwarding table 103.

Figure 5:
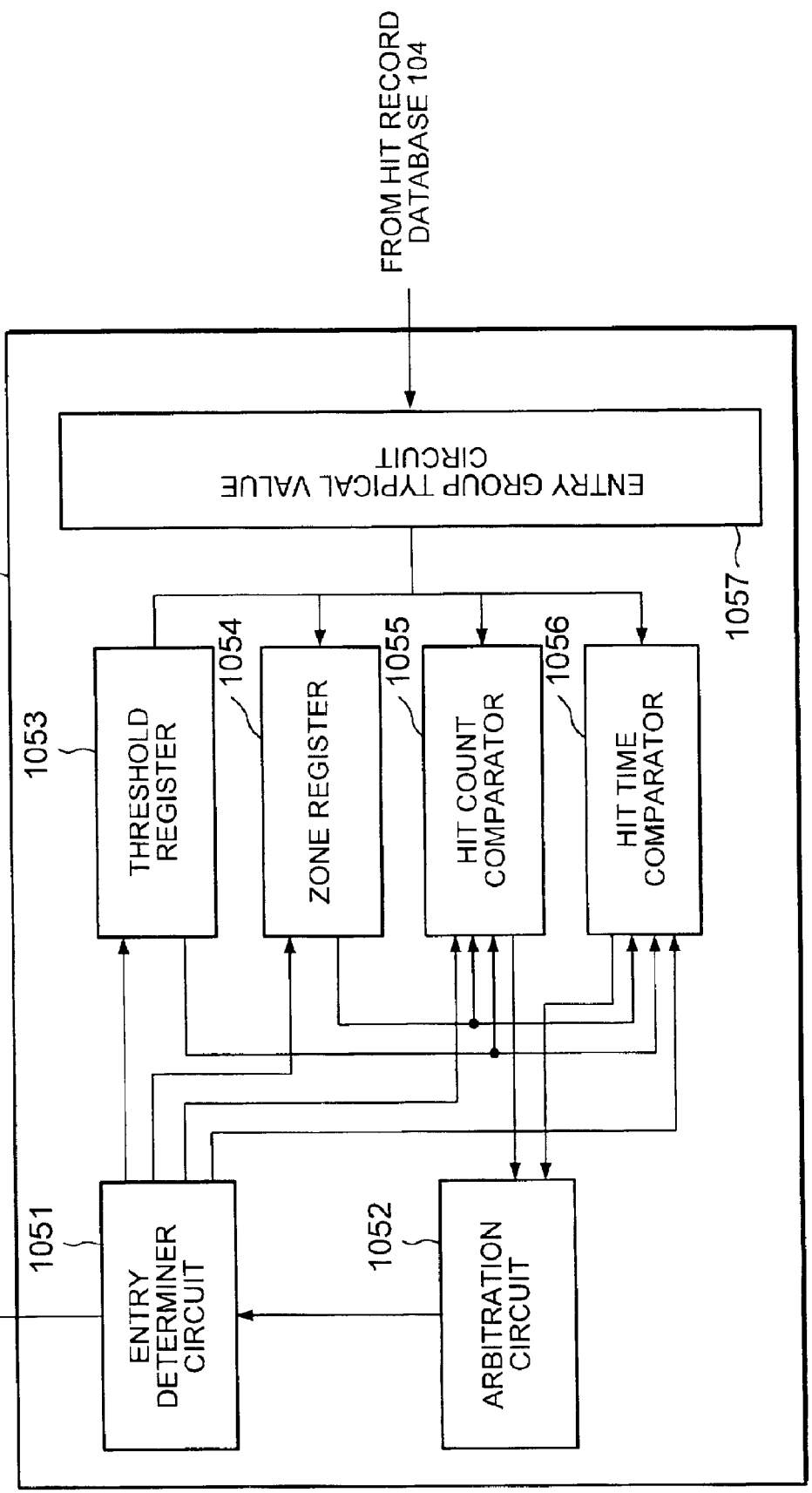
FIG. 5 is a detailed block diagram of the entry selection circuit 105 in FIG. 1.

FIG. 5 is a detailed block diagram of the entry selection circuit 105. The entry selection circuit 105 shown in FIG. 5 is comprised of an entry determiner circuit 1051, an arbitration circuit 1052, a threshold register 1053, a zone register 1054, a hit count comparator 1055, a hit time comparator 1056, and an entry group typical value circuit 1057.

Figure 6:
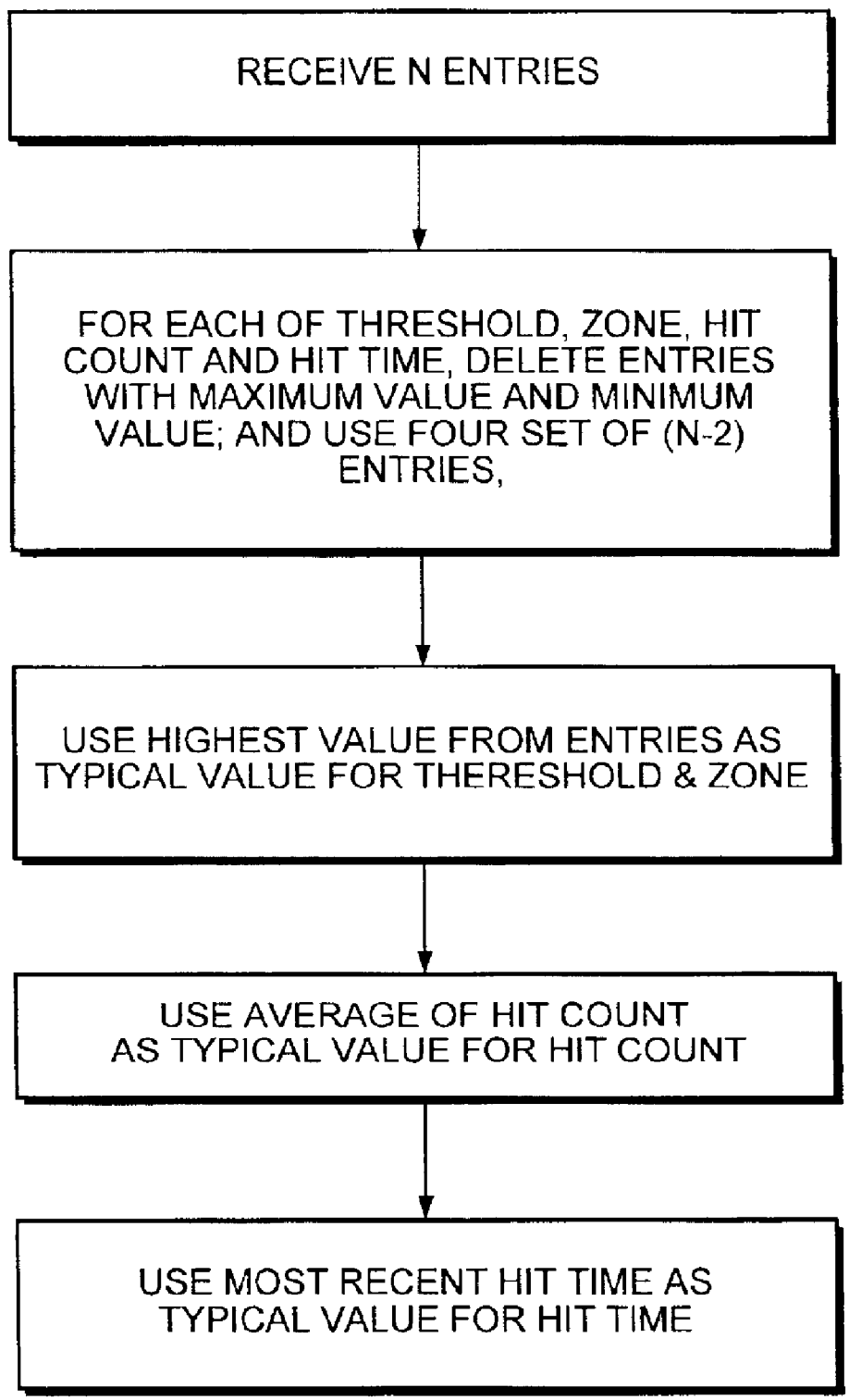
FIG. 6 is a process flowchart of the entry group typical value circuit 1057 in FIG. 5.

The entry group typical value circuit 1057 receives all (N pieces) entry information of all above mentioned entry groups. As shown by the flowchart in FIG. 6, the entry group typical value circuit 1057 excludes the entry having the maximum value and entry having the minimum value, per each threshold value, zone, hit count and hit time from all this entry information, and extracts the (N−2) entry. The four typical values of threshold value, zone, hit count and hit time are then determined from the extracted entry. The threshold and zone values as shown in FIG. 6 are the highest values within the extracted entry, the hit count is the average value, and the hit time is the most recent value. Each of the typical values are sent to the threshold register 1053, zone register 1054, hit count comparator 1055 and hit time comparator 1056.

The threshold value here, is a reference value for other attributes determining the priority level for entry group selection, or in other words, a reference value for comparing the zone, hit count and hit time. The zone value here, is that entry characteristic priority level and is acquired from the policy or the fee system.

The comparators 1055 and 1056 hold a table linking the entry groups already present in the cachetable 102 and the typical values for those entry groups. The typical value for the entry groups in that table are compared with values sent from the entry group typical value circuit 1057 and a comparison made while taking the zone and threshold value into account. In this embodiment, the hit count and the hit time are compared to the threshold value, and only entry groups exceeding the threshold value are selected. The hit count and hit time for all entry groups held in the comparators 1055 and 1056 are multiplied by the priority level. A priority level is assigned to each entry group in the order of the size of the calculated value. The order of the comparison results, typical values sent from the entry group typical value circuit 1057, and typical values of the entry group already present in the cache table 102 are sent to the arbitration circuit 1052.

Figure 7:
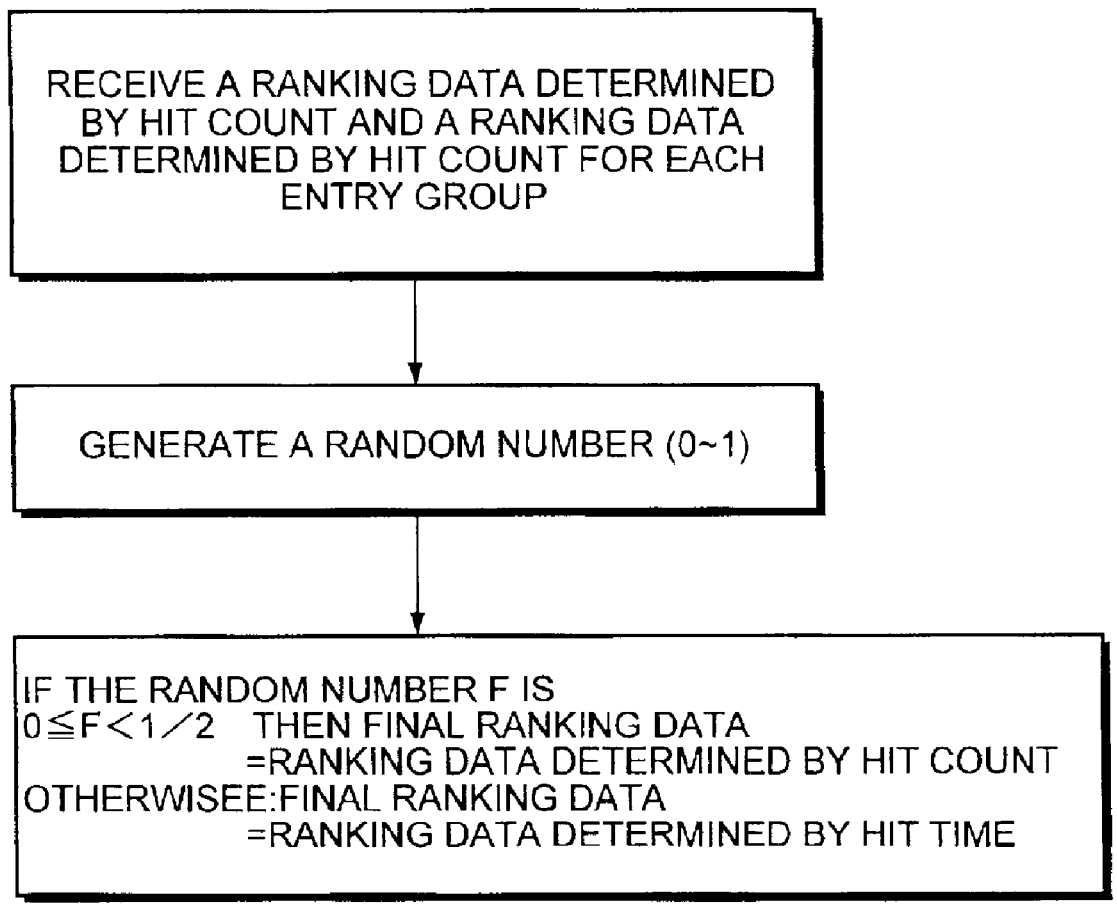
FIG. 7 is a detailed block diagram of the arbitration circuit 1052 in FIG. 5.

In the arbitration circuit 1052 when there is a difference in the rank of the data sent from the respective circuits, these differences are referred to and a final rank determined as shown in the process flowchart in FIG. 7. A random number from 0 to 1 is generated as shown in FIG. 7, that random number divided into two parts and hit count and hit time allotted to each parts, the rank of the allotted attributes is sent to the entry determiner circuit 1051 as the final rank.

The entry determiner circuit 1051 monitors the available space in the cache table 102, and checks whether or not space is available so N entries can be added. When empty space is available, the entry determiner circuit 1051 writes the N entries as is. However, when no empty space is available, the entry determiner circuit 1051 deletes the lowest ranking entry group from the cache table 102 and repeats the deletions until sufficient space is available. Finally, the information on the deleted entry groups are sent to each of the circuits 1053 through 1056. The circuits 1053 through 1056 receive the information on the deleted entry groups and delete those entry groups from the table.

The priority level is determined by the four attributes of threshold value, zone, hit count and hit time as described above however the invention is not limited to this method and may use at least one additional attribute for determining the priority level.

Next, in the second embodiment of the invention is described. In this embodiment the interior of the cache table 102 is divided into two zones, and an example is described setting these zone respectively as A and B. In this example, a hit count is recorded in each entry in the hit record database 104. The entry selection circuit 105 marks for erasure from the cache table 102, hit count typical values for entry groups in zone A that are lower than a threshold value M. In the zone B, hit count typical values for entry groups that less than half the threshold value M are marked for erasure. Further, entry groups marked for erasure are assigned a weight of 2 to 1 for zone A and zone Band the entry group for erasure selected from the cache table 102. For example, the threshold value of zone A is 10, and for zone B is 5, and entry groups below these threshold values are selected from zone A and zone B. In these selected entry groups, entry groups are further selected for erasure based on a probability variable N. According to weighting entry groups in zone A are set as N, and the weighted entry groups in zone B are set as 2N. Entry groups with the highest probability are therefore selected for erasure. This process is repeated if further deletions are required.

The weighting for A can also be set to 0 (zero) and A eliminated as a candidate for erasure regardless of the probability for A. Conversely, the threshold can be set to infinity so that typical values of hit counts for all entries are less than the threshold value, in other words, no effective threshold value is used.

A method not utilizing a hit count may also be used. In the above example, the threshold and the typical values for the hit count, were utilized in zones A and B. However a different optional combination can also be used for zones A and B. Thresholds with different values for example, can be assigned to the zones A and B, and in zones a and b completely separate from zones A and B, separate typical values for respectively an average value of the respective hit count and maximum value can also be utilized.

The entry selection circuit 105 may also perform operations in the cache table 102, and perform the same operations in the forwarding table 103, and select entries from the forwarding table 103 for input to the cache table 102.

The third embodiment of the invention is next explained. In this embodiment, each entry possesses zone information and threshold values showing what zone in the forwarding table the entries can be input (what zone the entries can belong to) as attributes for determining the entry priority level. The attributes in this embodiment are fixed, but dynamically changing attributes can also be used. In the case of dynamic changes for example, changes in the attribute can be made according to the policy server instructions. Rules for the policy server to run the network are listed by the network supervisor. When a rule is listed in the policy server for example that entries in the daytime have high priority but entries at nighttime have low priority, the policy server must switch priority levels each day and night to conform to that rule, and switch the priority level of each entry.

Figure 8:
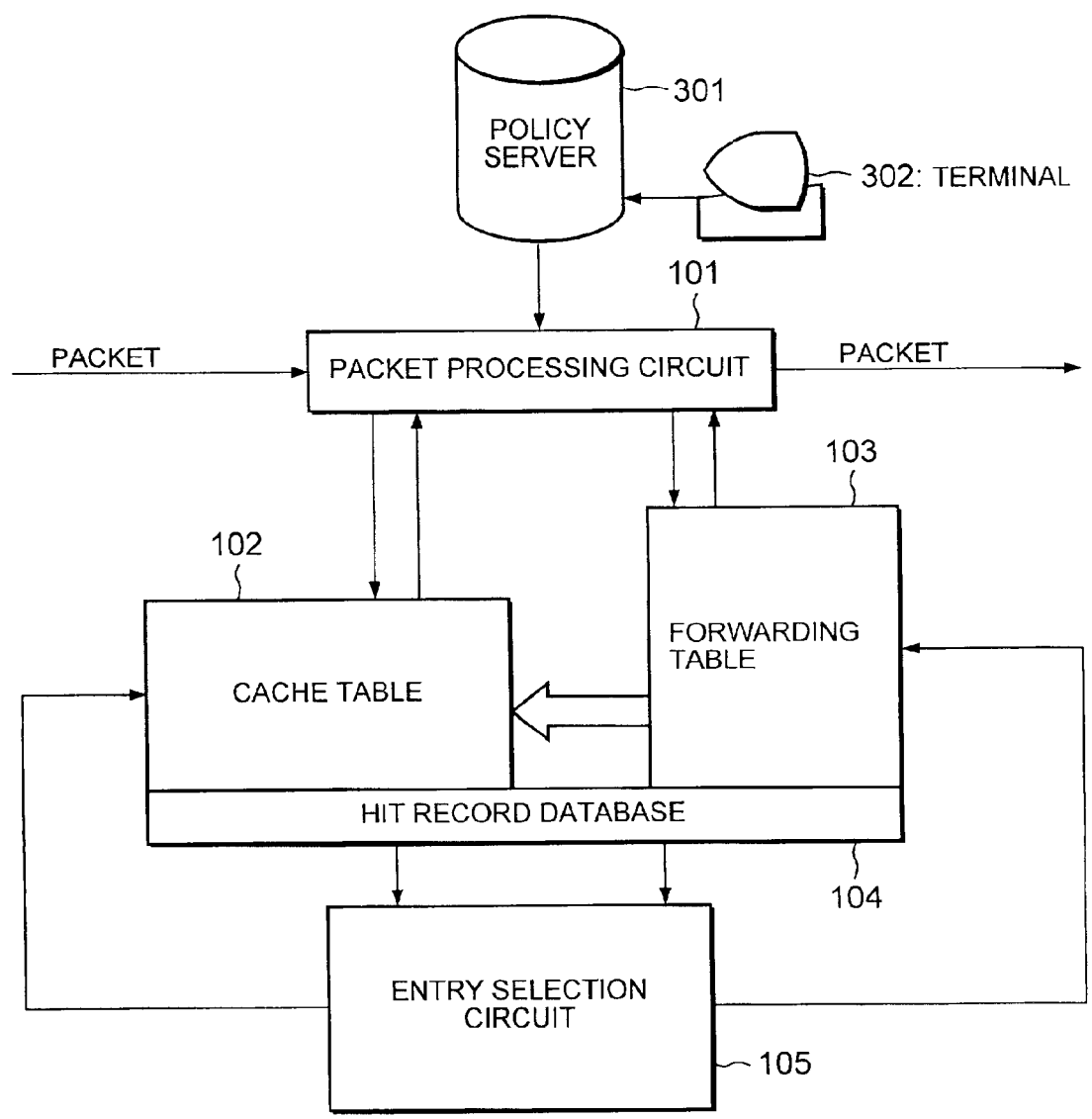
FIG. 8 is a block diagram of the second embodiment of the invention.

FIG. 8 is an overall block diagram of the router of the third embodiment of the invention installed with a policy server 301. A policy server 301 defines the entry zone and threshold values in the hit record database 104 and the entry selection circuit 105, and reflects these values in priority control by way of the mapping circuit 1043 and the mapping circuit 1058.

Figure 9:
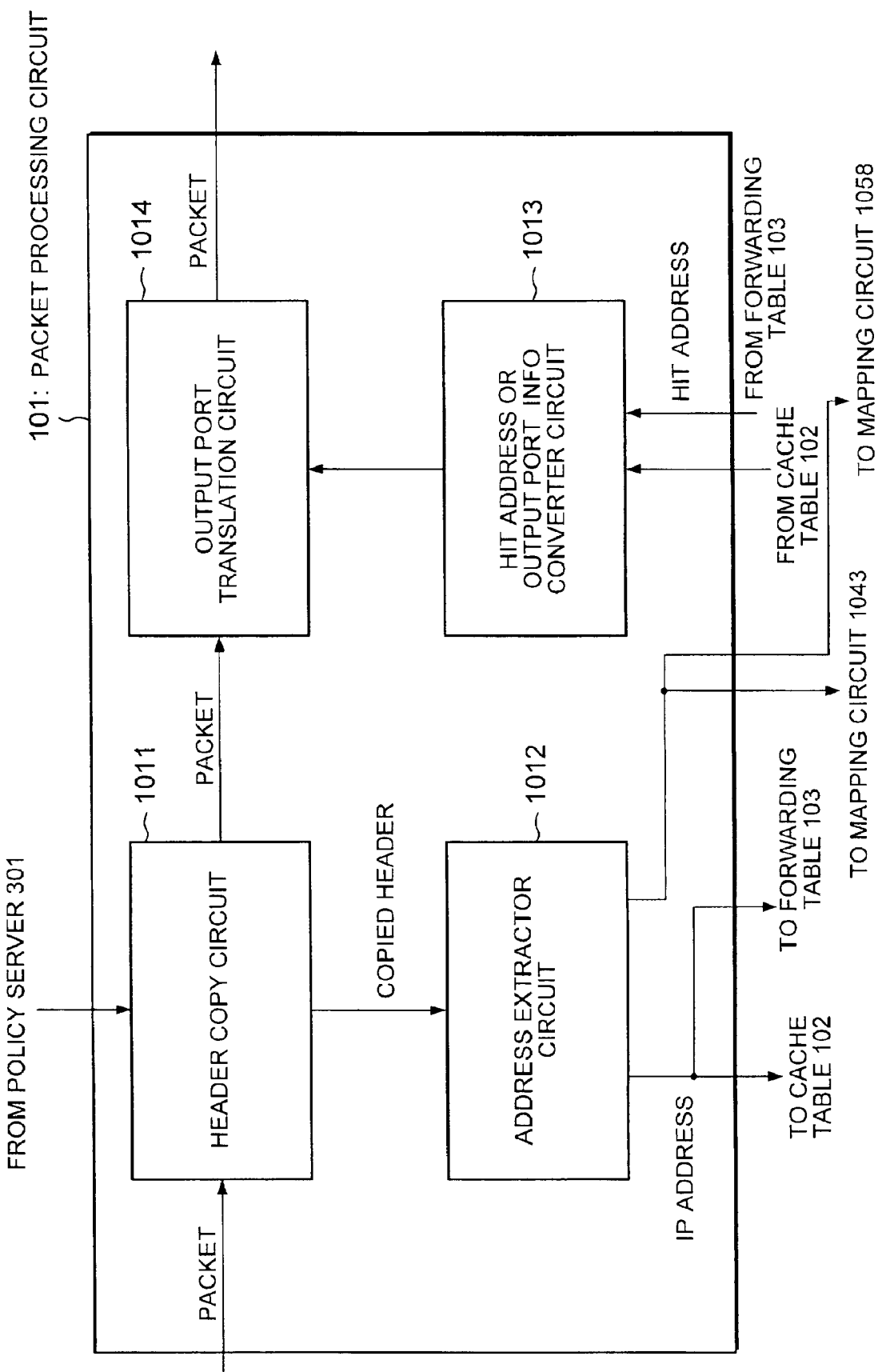
FIG. 9 is a detailed block diagram of the packet processing circuit 101 in FIG. 8.

The policy server 301 in other words, receives from a terminal 302, values for zones and thresholds defined for each entry by the user in the forwarding table, and retains these values. When a change occurs in the information being retained, the policy server 301 sends that information by way of the header copy circuit 1011 and the address extractor circuit 1012 within the packet processing circuit 101, to the hit record database 104 and the entry selection circuit 105 (see FIG. 9).

Figure 10:
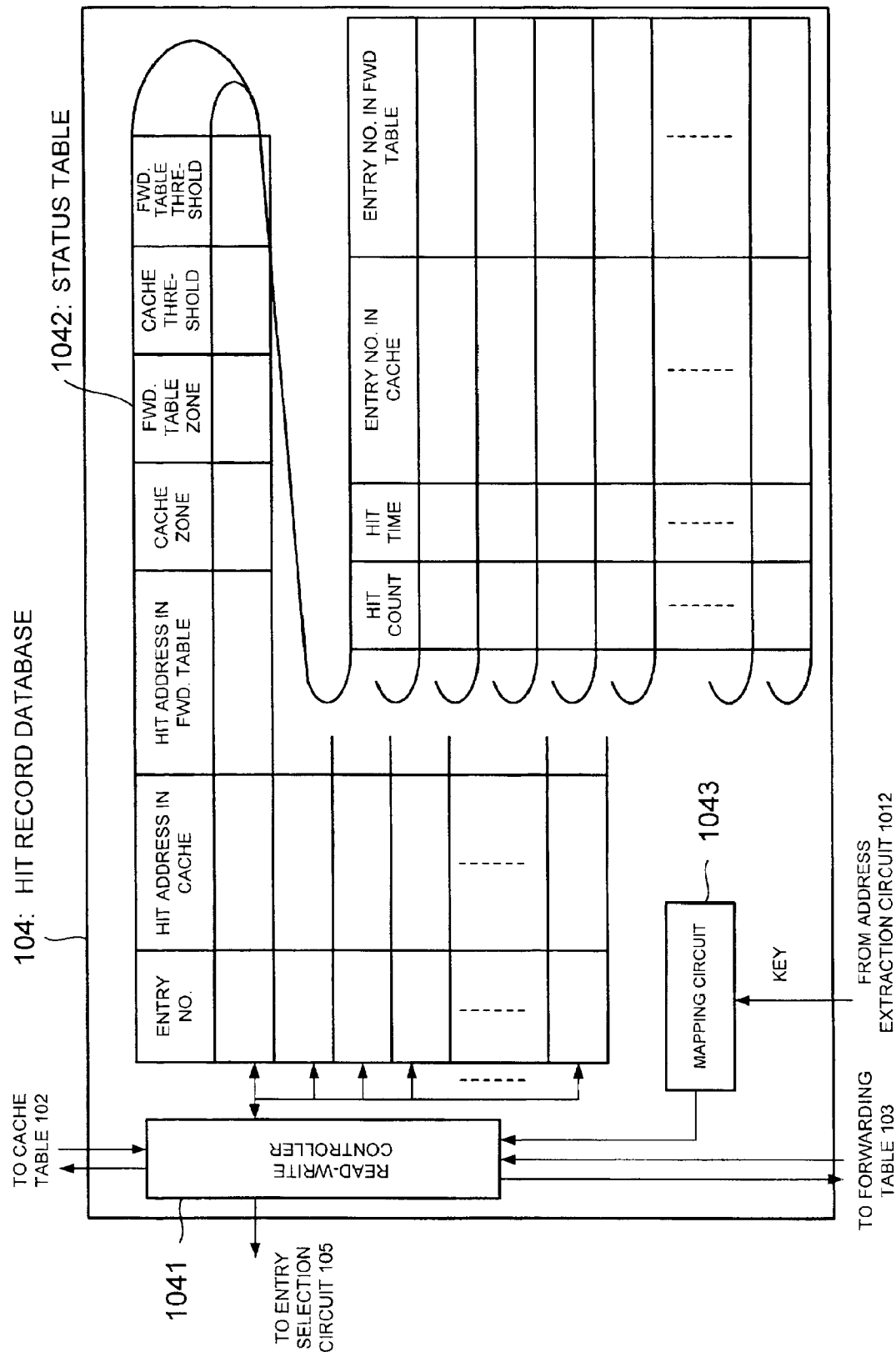
FIG. 10 is a detailed block diagram of the hit record database in FIG. 8.
Figure 11:
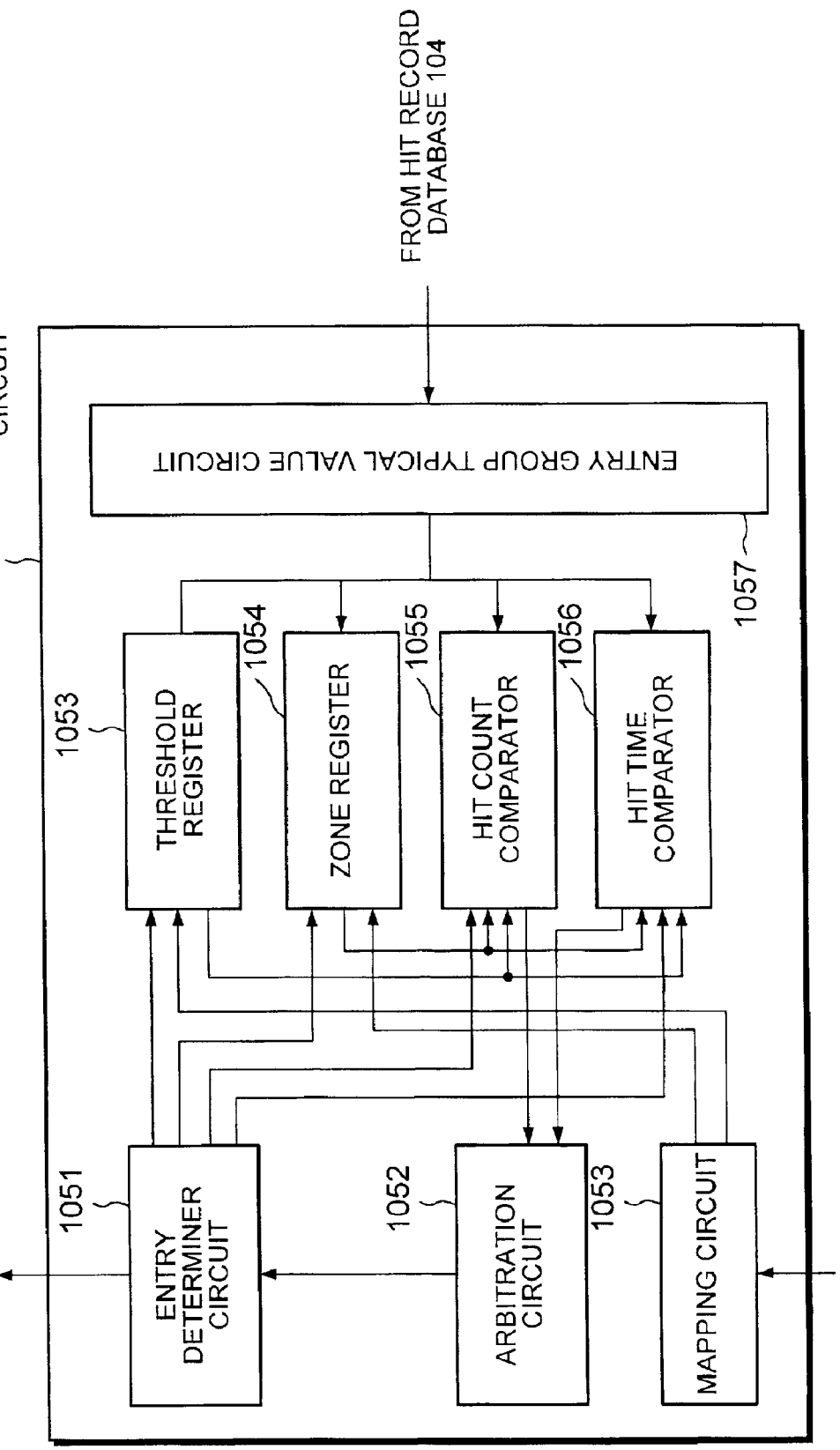
FIG. 11 is a detailed block diagram of the entry selection circuit in FIG. 8.

In the hit record database 104, the mapping circuit 1043 writes the values for the zone and threshold that were changed, into the status table 1042 by way of the read/write controller 1041 (see FIG. 10). In the entry selection circuit 105, the mapping circuit 1058 changes (rewrites) the threshold value and zone for each entry present in the threshold register 1053 and zone register 1054 (see FIG. 11).

The fourth embodiment of the invention is next explained. In this embodiment, the attribute possessed by each entry is changed and obtained by means of the packet that was input. The packet header holds a value determining the attribute and the attribute of the entry that was a hit, is changed according to this value.

The address extractor circuit 1012 extracts the address from the copied packet header and sends that address to the cache table 102 and the forwarding table 103. Also, the zone value and threshold value are determined by the packet header address or a portion of header other than the packet header address (a value of the Time To Live (TTL) value of the IP version 4 packet header, for instance), and are sent to the mapping circuit 1043 and the mapping circuit 1058. When the TTL for the zone value and threshold values is for example 32 or more, the zone has low priority and the threshold is 50, and when the TTL is less than 32, the zone value has high priority and the threshold value is 100. The operation of the mapping circuit 1043 and the mapping circuit 1058 is the same as the operation in the third embodiment.

The fifth embodiment of the invention is next explained. In this embodiment, during evaluation (rating) of typical values of the entry group, the entry selection circuit 105, first of all selects an entry according to the specified rules from all the entries comprising the entry group. The typical values of the entry group are then found based on the selected entries (entries to be calculated). The average values from among all values except for the minimum and maximum values of the entry comprising the entry group are then set as the typical values. Alternatively, the average values for the entry time excluding the most recent (most recent past) time of the hit entries comprising the entry group are set as the typical values.

The sixth embodiment of the invention is next explained. In this embodiment, during evaluation (rating) of typical values of the entry group by the entry selection circuit 105, a selected value is utilized from among all entry values to be calculated according to the specified rules. The most recent (most recent past) time for example of the entry hit times is set as the typical value.

The program for implementing the cache management device explained above may be recorded on a recording medium such as a semiconductor memory, CD-ROM or floppy disk, loaded into the router and implemented. The router contains a recording device to implement the cache and hit database. The loaded program has the same functions as the packet processing circuit and entry selection circuit.

Figure 13:
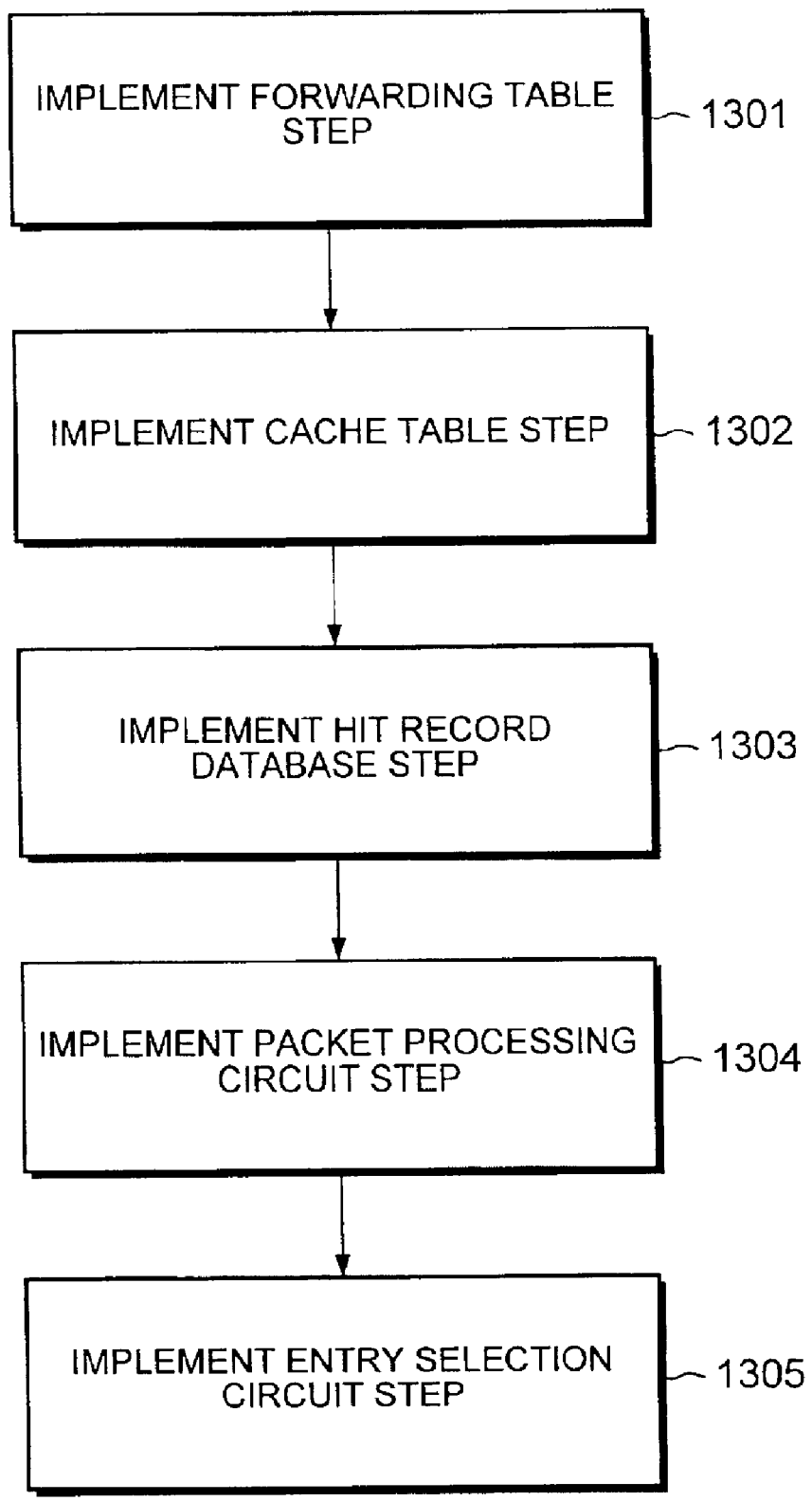
FIG. 13 is a process flowchart for the program achieved in the router of the cache table management device of the invention.
Figure 14:
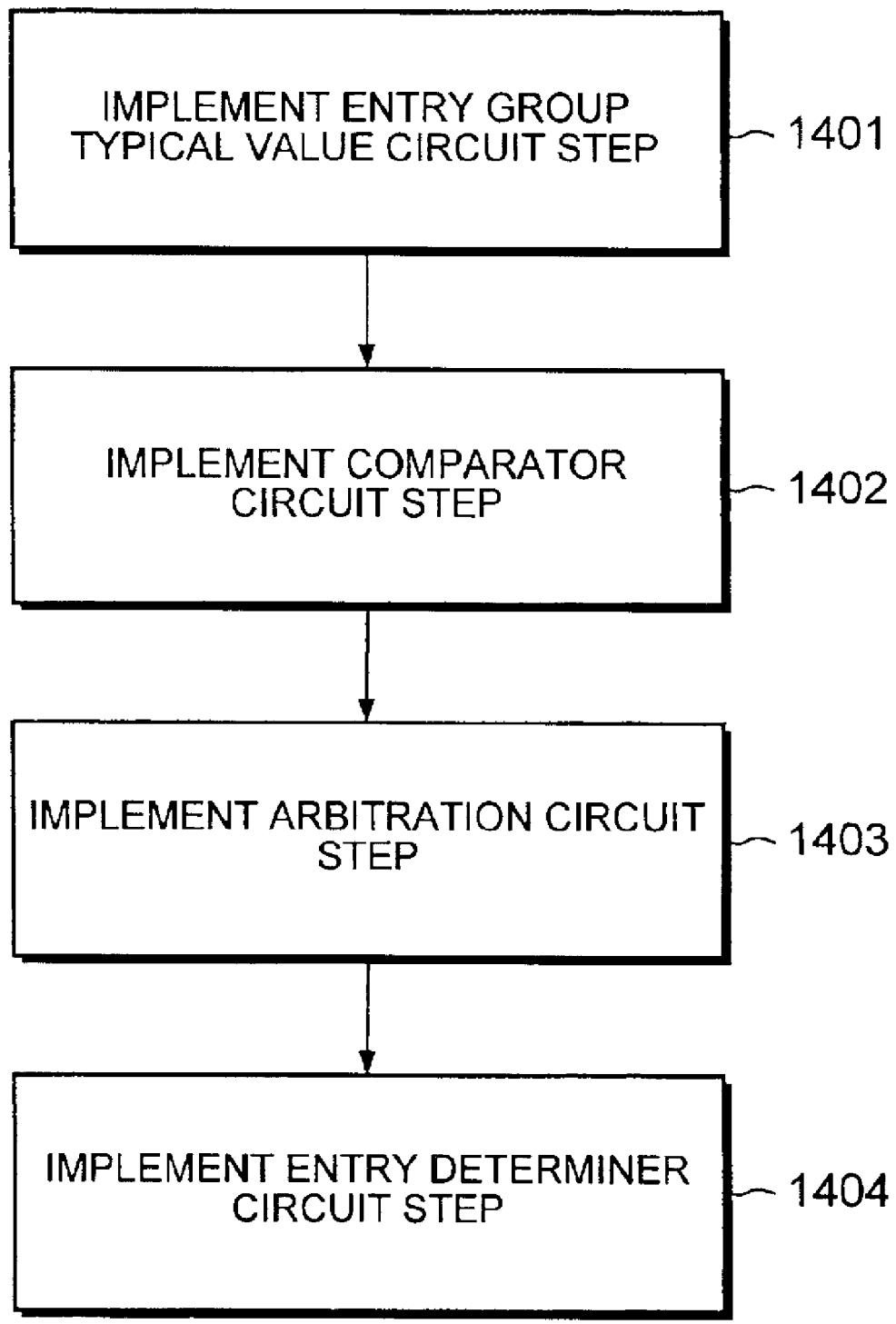
FIG. 14 is a detailed flowchart of the entry select circuit step 1305 in FIG. 13.

The program processing for implementing the cache management device is described while referring to FIG. 13 and FIG. 14.

The forwarding table 103 is implemented (step 301) in the recording device contained in the router. Next, the cache table 103 is implemented (step 1302) in the recording device contained in the router. Then, the hit record database is implemented (step 1303) in the recording device contained in the router. In other words, the forwarding table 103, the cache table 102, and the hit record database 104 are implemented on the recording device in FIG. 1 and FIG. 8.

Next, the packet processing circuit 101 is implemented (step 1304) in the router, and further, the entry determiner circuit is implemented (step 1305) in the router.

The step for implementing the entry determiner circuit is next described while referring to FIG. 14.

First, the entry determiner circuit 1057 is implemented (step 1401). Next, the comparator circuits (threshold register 1053, zone register 1054, hit comparator circuit 1055, and hit time comparator 1056) are implemented (step 1402). The arbitration circuit 1052 is next implemented (step 1403). Further, the entry determiner circuit is implemented (step 1404).

By implementing the above steps, the above described cache management device is and operated and run in the router.

In a first effect of the invention, the cache hit probability can be improved even if the entries are inserted and removed from the cache in groups. The reason this effect can be achieved is that often used entries are placed in the cache. Often used entries are selected by utilizing a priority level determined by factors such as the frequency of usage and the overall use count. The cache hit rate is clearly improved by selecting entries with a high frequency of usage compared to selecting entries at random.

In a second effect of the invention, the attributes of an entry to have improved processing performance can be specified based on a certain policy so that a level of priority can be attached. In a fee system for example that applies different fees to each customer, by raising the priority level of entries containing addresses of clients from whom high fees are obtained, the packets exchanged with those clients can be processed at high speed and can be discriminated from clients paying low fees.

What is claimed is:

1. A cache table management device used in a router wherein the device comprises:

a forwarding table having a plurality of entries, each of said entries having a set of information showing a collection of addresses comprised of prefix bits and prefix lengths, information showing packet output paths for the address collection, the priority level information, and said forwarding table being searched by a longest prefix match search;

a cache table for, when entries are substituted, being written the entry group containing the entry to be substituted and the applicable child of the substituted entry from the forwarding table, and for being deleted on moved, when deleting or moving entries, the entry group containing the applicable entry and the applicable parent of the deleted on moved entry;

a hit record database containing hit information added to the contents of the applicable entry among all entries of the forwarding table, contents of said hit record database being updated when a hit occurs in the forwarding table or the cache table;

a packet processing circuit to extract the destination network address from an input packet, to search the forwarding table or the cache table using the destination network address as a key, and to transmit the packet on the acquired output paths; and an entry selection circuit to select entry groups to be interchanged when needed while taking the information from the bit data base and priority level information into account;

wherein the router entry selection device comprises:

an entry group typical value circuit to receive entry group information from the hit database, and determining from the entry group information a typical value for evaluating entry usage status, and a typical zone value and/or typical threshold value in the entry priority level;

a comparator circuit, having a table linking the entry groups already present in the cache table 102 and the typical values for those entry groups, for comparing the typical values of the entry group and the typical values sent from the entry group typical value circuit, and for sending the priority rankings of the entry groups present in the cache table;

an arbitrator circuit to determine the final interchanging ranking of the entry group based on the priority rankings sent from the comparator circuit; and an entry determiner circuit to monitor available space in the cache table and to delete cache table entries from low ranking entries determined by the arbitrator circuit and to send information to the comparator circuit on the deleted entry groups for deletion from the cache table when no empty space is available after checking for available space to add an entry group.

2. A cache table management device used in a router according to claim 1, wherein the cache table is divided into a plurality of zones, and the interchanging, deletion or movement of entry groups is performed in the respective zones.

3. A cache table management device used in a router according to claim 1, wherein the values for evaluating the entry usage status are the hit count and the hit time.

4. A cache table management device used in a router according to claim 1, wherein the typical values are the maximum value among the threshold value and zone, the average value among the hit counts, and the most recent value among the hit times.

5. A cache table management device used in a router according to claim 4, wherein the priority level within entries of the forwarding table is rewritten according to the policy server.

6. A cache table management device used in a router according to claim 1, wherein said attributor circuit generates a random number from 0 to 1, divides the random number into two parts, and allots each part of a hit count and hit time, and has the ranking of the allotted attribute the final ranking.

7. A cache table management device used in a router according to claim 1, wherein the cache table management device is further comprising a means for setting the entry priority level according to information acquired from the received packet.

8. A medium for recording programs implemented in a router, wherein the program comprising:

(a) implementing on a recording device, a forwarding table containing a plurality of entries each of which includes information showing the collection of addresses comprised of prefix bits and prefix lengths, information showing the output paths of packets for the collection of addresses and priority level information, said entries being searched by longest prefix method;

(b) implementing the cache table on a recording device, when an entry of said cache table is interchanged, the entry group comprised of the entry to be added and the child entry of the applicable entry is written from the forwarding table, or when an entry is to be deleted or moved, the entry group comprised of the entry for interchanging and the parent entry of the applicable entry is deleted or moved;

(c) implementing the hit database of all entries of said forwarding table on a recording device wherein said hit database or said hit information of said all entries and are update when a hit occurred in the forwarding table or cache table;

(d) implementing the packet processing circuit in said router extracting the destination network address from the applicable packet header of the input packet, searching the cache table or forwarding table using the destination network address as a key, and for sending the packet on the acquired output path;

(e) implementing entry selection circuit on the router for selecting the entry group to be interchanged by taking into account the priority level information and the information from the hit database when interchanging an entry group;

wherein the entry selection circuit is implemented on the router in an operation comprising:

(a) implementing a function of an entry group typical value circuit which receives entry group information from the hit record database, and determines typical values of entry usage ratings, and typical and/or threshold values for zones constituting entry priority levels;

(b) implementing a function of a comparator circuit having a table which has entry groups linked with entry group typical values for entry groups present in the cache table, comparing the typical values of each entry group on the table with typical values sent from the entry group typical value circuit, and sending the priority rankings of the entry groups present in the cache table;

(c) implementing a function of an arbitration circuit to determine the final interchange ranking of the entry groups based on the priority rankings sent from the comparator circuits; and (d) implementing a function of an entry determiner circuit for monitoring the available space in the cache table and for deleting, in case of no available space, the cache table entries of low ranking entry groups determined by the arbitrator circuit and sending information to the comparator circuit on the deleted entry groups for deletion from the cache table.

* * * * *